(12) United States Patent
Jang

(10) Patent No.: US 11,370,023 B2
(45) Date of Patent: Jun. 28, 2022

(54) PRODUCTION OF METAL NANOWIRES DIRECTLY FROM METAL PARTICLES

(71) Applicant: Nanotek Instruments, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 16/258,849

(22) Filed: Jan. 28, 2019

(65) Prior Publication Data

US 2020/0238377 A1 Jul. 30, 2020

(51) Int. Cl.
*B24B 37/34* (2012.01)
*B22F 1/17* (2022.01)
(Continued)

(52) U.S. Cl.
CPC ............... *B22F 1/17* (2022.01); *B22F 9/16* (2013.01); *H01M 4/364* (2013.01); *B22F 2301/052* (2013.01); *B22F 2301/058* (2013.01); *B22F 2301/10* (2013.01); *B22F 2301/255* (2013.01); *B22F 2301/30* (2013.01);
(Continued)

(58) Field of Classification Search
CPC .. B05D 7/24; B05D 2202/00; B05D 2202/25; B05D 2202/40; B22F 1/025; B22F 9/16; B22F 2301/058; B22F 2301/10; B22F 2301/255; B22F 2301/30; B22F 2304/054;
(Continued)

(56) References Cited

U.S. PATENT DOCUMENTS 9,774,033 B2 * 9/2017 Fang .................. C01B 33/02
2004/0005723 A1 1/2004 Empedocles et al.
(Continued)

FOREIGN PATENT DOCUMENTS

CN 102553588 B 1/2014
KR 1020130074826 A 7/2013
(Continued)

OTHER PUBLICATIONS

Delsante et al., "Synthesis and thermodynamics of Ag—Cu nanoparticles" Physical Chemistry Chemical Physics (2015) vol. 17, No. 42, pp. 28387-28393.
PCT/US20/15356 International Search Report and Written Opinion dated May 25, 2020, 12 pages.

*Primary Examiner* — Nathan T Leong

(57) ABSTRACT

Disclosed is a process for producing metal nanowires having a diameter or thickness from 2 nm to 100 nm, the process comprising: (a) preparing a source metal particulate having a size from 50 nm to 500 μm, selected from a transition metal, Al, Be, Mg, Ca, an alloy thereof, a compound thereof, or a combination thereof; (b) depositing a catalytic metal, in the form of nanoparticles or a coating having a diameter or thickness from 1 nm to 100 nm, onto a surface of the source metal particulate to form a catalyst metal-coated metal material, wherein the catalytic metal is different than the source metal material; and (c) exposing the catalyst metal-coated metal material to a high temperature environment, from 100° C. to 2,500° C., for a period of time sufficient to enable a catalytic metal-assisted growth of multiple metal nanowires from the source metal particulate.

13 Claims, 6 Drawing Sheets

(51) Int. Cl.
  *B22F 9/16*       (2006.01)
  *H01M 4/36*       (2006.01)
  *H01M 4/02*       (2006.01)
  *H01M 10/0525*    (2010.01)

(52) U.S. Cl.
  CPC ... *B22F 2304/054* (2013.01); *H01M 10/0525* (2013.01); *H01M 2004/027* (2013.01)

(58) Field of Classification Search
  CPC ............ H01M 4/364; H01M 10/0525; H01M 2004/027
  See application file for complete search history.

(56) References Cited

U.S. PATENT DOCUMENTS

| | | | |
|---|---|---|---|
| 2009/0197416 A1 | 8/2009 | Lee et al. | |
| 2014/0054516 A1* | 2/2014 | Moon | B22F 1/0025 252/514 |
| 2014/0363567 A1* | 12/2014 | Koo | H01B 1/02 427/120 |

FOREIGN PATENT DOCUMENTS

| | | | | |
|---|---|---|---|---|
| WO | WO-2012161857 A1 * | 11/2012 | ............... | C30B 7/14 |
| WO | WO-2013042048 A1 * | 3/2013 | ............ | B01J 35/002 |

\* cited by examiner 200 nm CuNW 200 nm AgNW

1 μm NiNW

US 11,370,023 B2

PRODUCTION OF METAL NANOWIRES DIRECTLY FROM METAL PARTICLES

FIELD OF THE INVENTION

This invention relates to a process for producing metal nanowires for lithium-ion battery anode and electronic device applications.

BACKGROUND

Nanowires are finding increasing application in electronic, opto-electronic and nanoelectromechanical devices. Nanowires may also be used as additives in advanced composites, for metallic interconnects in nanoscale quantum devices, as field-emitters and as leads for biomolecular nanosensors. Nanowires of Zn, Cd, Al, Sn, Si, Ge, and Pb are also good anode active materials for the lithium-ion battery due to their high lithium storage capacity.

Lithium ion battery is a prime candidate energy storage device for electric vehicle (EV), renewable energy storage, and smart grid applications. Graphite materials have been widely used as an anode active material for commercial lithium ion batteries due to their relatively low cost and excellent reversibility. However, the theoretical lithium storage capacity of graphite is only 372 mAh/g (based on $LiC_6$), which can limit the total capacity and energy density of a battery cell. The emerging EV and renewable energy industries demand the availability of rechargeable batteries with a significantly higher energy density and power density than what the current Li ion battery technology can provide. Hence, this requirement has triggered considerable research efforts on the development of electrode materials with higher specific capacity, excellent rate capability, and good cycle stability for lithium ion batteries.

Several elements from Group III, IV, and V in the periodic table can form alloys with Li at certain desired voltages. Therefore, various anode materials based on such elements (e.g. Si, Ge, Sn, Sb, Cd, Zn, etc.), their compounds, and some metal oxides (e.g., $SnO_2$) have been proposed for lithium ion batteries. Among these, silicon is considered the most promising one since it has the highest theoretical specific capacity (up to 4,200 mAh/g in the stoichiometric form of $Li_{4.4}Si$) and low discharge potential (i.e., high operation potential when paired with a cathode).

However, using Si as an example, the dramatic volume changes (up to 380%) of Si during lithium ion alloying and de-alloying (cell charge and discharge) often led to severe and rapid battery performance deterioration. The performance fade is mainly due to the volume change-induced pulverization of Si and the inability of the binder/conductive additive to maintain the electrical contact between the pulverized Si particles and the current collector. In addition, the intrinsically low electric conductivity of silicon and other metal materials is another challenge that needs to be addressed. Thus far, many attempts have been made to improve the electrochemical performance of Si-based anode materials, which include (1) reducing particle size to the nanoscale (<100 nm), such as Si nanoparticles, nanowires, or thin film, to reduce the total strain energy, which is a driving force for crack formation in the particle; (2) depositing Si particles on a highly electron-conducting substrate; (3) dispersing Si particles in an active or non-active matrix; and (4) coating Si particles with a layer of carbon. Although some promising anodes with specific capacities in excess of 1,000 mAh/g (at a low charge/discharge rate; e.g. 0.1 C) have been reported, it remains challenging to retain such high capacities over cycling (e.g., for more than 100 cycles) without significant capacity fading. Furthermore, at a higher C rate, Si particles and other high-capacity anode active material (Ge, Sn, etc.) are typically incapable of maintaining a high lithium storage capacity. It may be noted that a rate of n C means completing the charge or discharge cycle in 1/n hours: 0.1 C=10 hours, 0.5C=2 hours, 3C=⅓ hours or 20 minutes.

Although nanoscaled anode active materials, such as nanowires of Ge, Sn, and Zn, are promising high-capacity anode materials for high charge/discharge rate applications, these materials remain too expensive to be economically viable.

For other applications, metal nanowires are not without issues. For instance, metal nanowires may be used as a conductive material for forming a transparent conductive film for display device applications. The metal nanowire may be a wire-shaped nanostructure having a thickness or diameter in the range from about 10 nm to about 100 nm, and a length from about 3 μm to about 100 μm. However, it has been challenging to control shapes of the metal nanowires. In many cases, nanoparticles, nanobars, or nanoclusters are inevitably formed during the process of forming the metal nanowires. The nanoparticles may be globe-shaped, plate-shaped or polyhedron-shaped. The nanobar may have a small aspect ratio (long axis-to-short axis ratio). The nanoclusters may be formed by aggregation of metal nanowires. These side effects lead to a reduced yield of metal nanowire production.

In other cases, metal nanowires may be surrounded by an organic protection agent that is added in order to guide the directional growth of the metal nanowires. Consequently, the contact resistance between the metal nanowires may be increased due to the presence of organic protection agent when multiple metal nanowires are combined to form a network of electron-conducting pathways. As a result, it may be difficult to maintain the high electric conductivity of the nanowire network.

Herein, we present a facile and cost-effective method of mass-producing metal nanowires. This method avoids all the problems commonly associated with conventional methods of producing nanoscaled metal wires.

SUMMARY OF THE INVENTION

The present invention provides a process for producing metal nanowires having a diameter or thickness from 2 nm to 100 nm, the process comprising: (A) preparing a source metal material in a solid particulate form (e.g. multiple particles of the source metal) having a size from 50 nm to 500 μm, wherein the source metal material is selected from a transition metal, Al, Be, Mg, Ca, an alloy thereof, a compound thereof, or a combination thereof; (B) depositing a catalytic metal, in the form of nanoparticles having a size from 1 nm to 100 nm or a coating having a thickness from 1 nm to 100 nm, onto a surface or surfaces of the source metal particulate to form a catalyst metal-coated metal material, wherein the catalytic metal is different than the source metal material; and (C) exposing the catalyst metal-coated metal material to a high temperature environment, from 100° C. to 2,500° C., for a period of time sufficient to enable a catalytic metal-assisted growth of multiple metal nanowires from the source metal particulate.

In certain embodiments, the catalytic metal (including a metalloid) is selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof, wherein the catalytic metal is different than the source metal material. Preferably, a catalytic metal and its pairing source metal material form a eutectic point in their phase diagram.

The transition metal as a source metal contains an element preferably selected from Cu, Ni, Co, Mn, Fe, Ti, Ag, Au, Pt, Pd, Zn, Cd, Mo, Nb, Zr, an alloy thereof, or a combination thereof. The alloy of a transition metal of interest may contain one or more different elements that constitute no greater than 30% by weight of the alloy. For instance, a Cu alloy in this context can contain up to 30% by weight of Zn or both Zn and Sn combined.

Particles of the source metal preferably have a diameter (or shortest dimension) from 100 nm to 100 μm, preferably <20 μm, further preferably <10 μm, still further preferably <5 μm, and most preferably <1 μm.

In certain embodiments, in the invented process, the step of depositing a catalytic metal includes (a) dissolving or dispersing a catalytic metal precursor in a liquid to form a precursor solution, (b) bringing the precursor solution in contact with a surface of the source metal particulate material (e.g. surfaces of multiple source metal particles), (c) removing the liquid; and (d) chemically or thermally converting the catalytic metal precursor to the catalytic metal coating or nanoparticles.

In the process, the step (d) of chemically or thermally converting the catalytic metal precursor may be conducted concurrently with the procedure (C) of exposing the catalyst metal-coated mixture mass to a high temperature environment.

In certain embodiments, the catalytic metal precursor is a salt or organo-metal molecule of a metal (including a metalloid) selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. In some preferred embodiments, the catalytic metal precursor is selected from a nitrate, acetate, sulfate, phosphate, hydroxide, or carboxylate of a metal (including a metalloid) selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. In some embodiments, the catalytic metal precursor is selected from a nitrate, acetate, sulfate, phosphate, hydroxide, or carboxylate of a transition metal.

The step (C) of exposing the catalyst metal-coated source metal material to a high temperature environment is preferably conducted in steps, including at least at a lower temperature (first temperature) for a first period of time and then at a higher temperature (second temperature) for a second period of time. These temperatures can include a first temperature from 100° C. to 1,000° C. and a second temperature from 300° C. to 2,500° C. The heat treatment at the first temperature is mainly aimed at reducing the metal precursor (e.g. a metal salt) to a metal phase or to activate the metal coated on the source metal particle surfaces. The heat treatment at the second temperature is aimed at building a thermodynamic environment conducive to initiation and growth of metal nanowires from the source metal particulate. It may be noted that the required high temperature range depends on the catalytic metal used, given the same source metal type.

In certain embodiments, the source metal material and the pairing catalytic metal form a eutectic point in the phase diagram and the procedure of exposing the catalyst metal-coated metal material to a high temperature environment includes exposing the material to an initial temperature (Ti) equal to or higher than the eutectic point (Te) for a desired period of time and then bringing the material to a temperature (Tc) below the initial temperature Ti; Tc may be above or below the eutectic point Te. In some embodiments, the exposure temperature (Ti and/or Tc) is higher than the eutectic temperature by 0.5 to 500 degrees on the Celsius scale (preferably by 1-100 degrees centigrade).

These metal nanowires appear to have extruded out from the starting source metal particles and emanate from a center of the source metal particle. The metal nanowires produced in this manner typically have a diameter less than 100 nm and a length-to-diameter aspect ratio of at least 5 (more typically l/d=10-10,000 and most typically 100-1,000).

In an embodiment, the step of depositing a catalytic metal on surfaces of the source metal particles includes (a) dissolving or dispersing a catalytic metal precursor in a liquid to form a precursor solution, (b) bringing the precursor solution in contact with surfaces of the source metal particle, (c) removing said liquid; and (d) chemically or thermally converting the catalytic metal precursor to the catalytic metal coating or nanoparticles. The step (d) of chemically or thermally converting the catalytic metal precursor is conducted concurrently with the procedure (C) of exposing the catalyst metal-coated material to a high temperature environment.

Preferably, the catalytic metal precursor is a salt or organo-metal molecule of catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. Examples of the precursors include copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper hydroxide, nickel hydroxide, cobalt hydroxide, manganese hydroxide, iron hydroxide, titanium hydroxide, aluminum hydroxide, copper carboxylate, nickel carboxylate, cobalt carboxylate, manganese carboxylate, iron carboxylate, titanium carboxylate, aluminum carboxylate, or a combination thereof.

The catalytic metal is preferably selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. They can be produced from the aforementioned precursors. Alternatively, the deposition of catalytic metal can be accomplished more directly. Thus, in an embodiment, the step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, ball milling, or a combination thereof.

The procedure of exposing the catalyst metal-coated source metal to a high temperature environment may be conducted in a protective atmosphere of an inert gas, nitrogen gas, hydrogen gas, a mixture thereof, or in a vacuum.

The presently invented process may further comprise a procedure of removing the catalytic metal from the metal nanowires after the nanowires are produced; for instance, via chemical etching or electrochemical etching.

For battery anode application, the process may further comprise a procedure of mixing metal nanowires (e.g. Zn and Cd nanowires) with a carbonaceous or graphitic material (as a conductive additive) and an optional binder material to form an electrode layer of a lithium-ion battery, wherein the carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

The present invention also provides a process for producing metal nanowires having a diameter or thickness from 2 nm to 100 nm, the process comprising: (a) preparing a source metal material in a particulate solid form (e.g. multiple particles of a source metal) having a size from 50 nm to 100 μm, wherein the source metal material is selected from a transition metal, Al, Be, Mg, Ca, an alloy thereof, a compound thereof, or a combination thereof; (b) depositing a catalyst metal precursor onto surfaces of the source metal particulate to form a catalyst metal precursor-coated metal material; and (c) exposing the catalyst metal precursor-coated metal material to a high temperature environment, from 100° C. to 2,500° C., for a period of time sufficient to convert the catalyst metal precursor to a metal catalyst in the form of nanoparticles having a size from 1 nm to 100 nm or a coating having a thickness from 1 nm to 100 nm in physical contact with the source metal particulate, and enable a catalyst metal-assisted growth of multiple metal nanowires from the source metal particulate. It is essential that the catalyst metal nanoparticles or coating are in physical contact with the source metal particulate, preferably deposited on surfaces of the particulate.

In certain preferred embodiments, the source metal material and the catalyst metal form an eutectic point and step (c) of exposing the catalyst metal precursor-coated metal material to a high temperature environment includes exposing the coated metal material to an exposure temperature equal to or higher than the eutectic point for a desired period of time and then bringing the material to a temperature below this exposure temperature for a desired period of time or at a desired temperature decreasing rate.

The present invention also provides a battery electrode containing metal nanowires that are produced by the inventive process. Also provided is a lithium battery containing metal nanowires produced by the inventive process as an anode active material.

The invention also provides a microelectronic device containing metal nanowires produced using the instant process. The electronic devices include a transistor, junction diode, FET, logic gate, display device (e.g. touch panel display), sensor, laser, solar cell, optoelectronic device, nanoelectronic device, energy-harvesting device, electrical interconnect, optical waveguide, and mechanical resonator, etc.

DETAILED DESCRIPTION OF PREFERRED EMBODIMENTS

The present invention provides a process for initiating and growing metal nanowires from micron or sub-micron scaled source metal particles having an original particle diameter (prior to nanowire growth) from 50 nm to 500 μm (preferably from 100 nm to 20 μm). In other words, the starting metal material (or called source metal material) is micron or sub-micron scaled metal particles, which are thermally and catalytically converted directly into nanoscaled, wire-shaped structures having a diameter or thickness from 2 nm to 100 nm.

Figure 4:
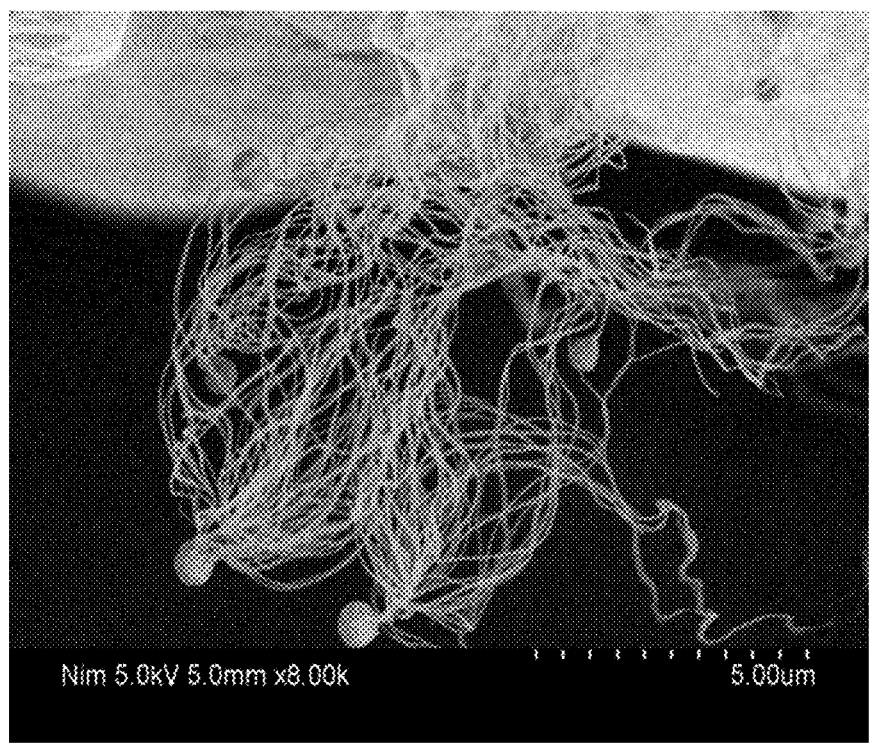
FIG. 4 SEM image of Si nanowires
Figure 5A:
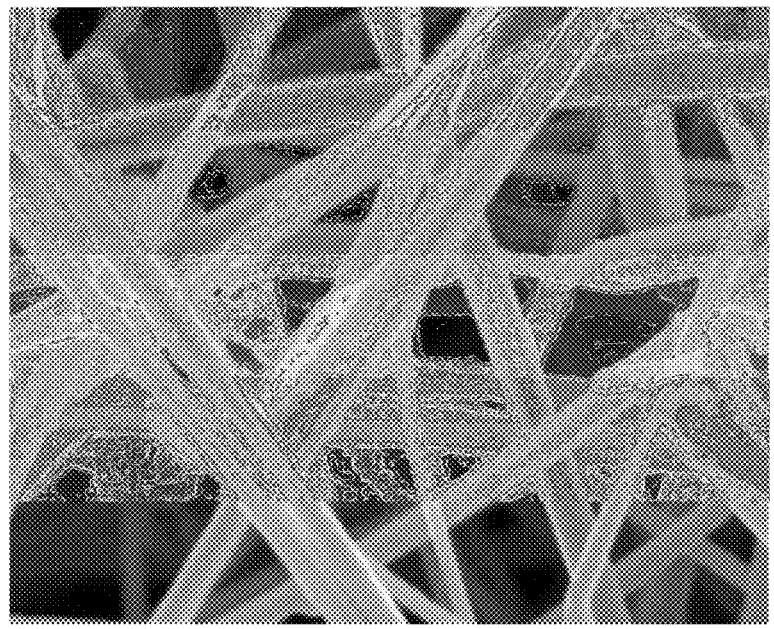
FIG. 5(A) SEM image of Cu nanowires.
Figure 5B:
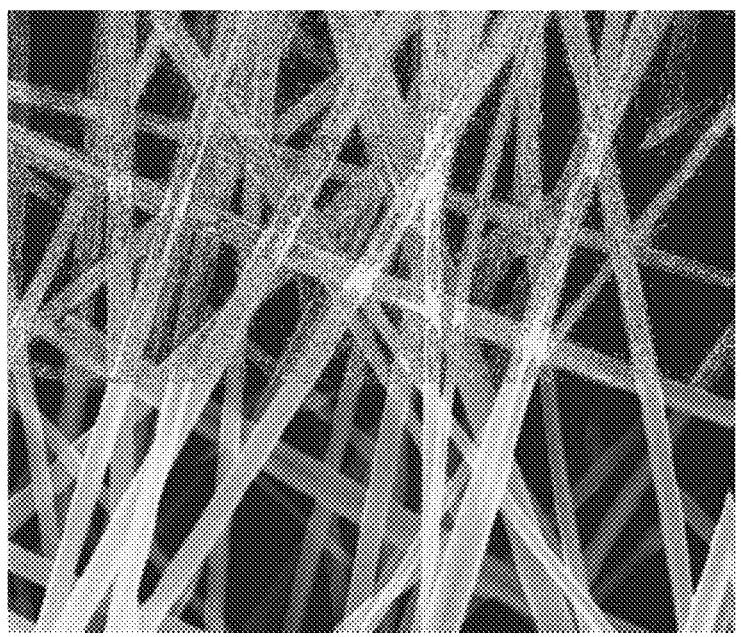
FIG. 5(B) SEM image of Ag nanowires.
Figure 5C:
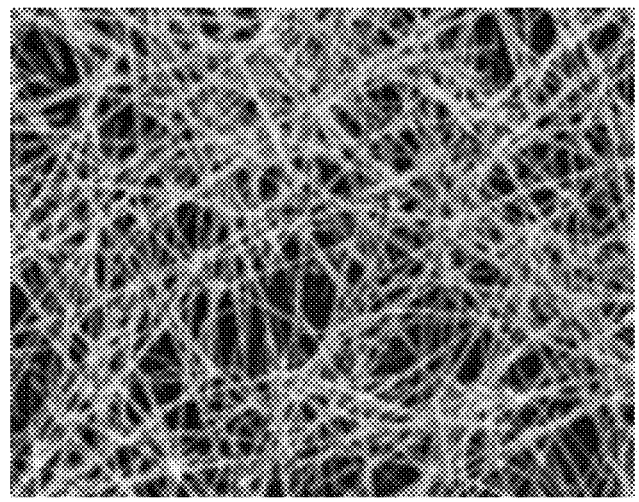
FIG. 5(C) SEM image of Ni nanowires.

Studies using scanning electron microscopy (SEM) indicate that tens of nanowires can be grown or "extruded out" from a starting solid particle. As an example, FIG. 4 shows that tens of Si nanowires have been sprouted or emanated from each Si particle that was originally 2-3 μm in diameter. These Si nanowires have drawn the needed Si atoms from the few starting Si particles. By spitting out a large number of nanowires, the original Si particles, if smaller than 2 μm in diameter, were fully expended. When larger particles having an original diameter>3 μm were used, there were typically some residual Si particles left. SEM images of Cu, Ag, and Ni nanowires are shown in FIG. 5(A), FIG. 5(B), and FIG. 5(C), respectively.

There are several advantages associated with this process. For instance, there is no chemical reaction (such as converting $SiH_4$ into Si in a CVD process) and the process does not involve any undesirable chemical, such as silane, which is toxic. There is no danger of explosion, unlike the process of converting $SiO_2$ to Si using magnesium vapor. Other additional advantages will become more transparent later.

Figure 1:
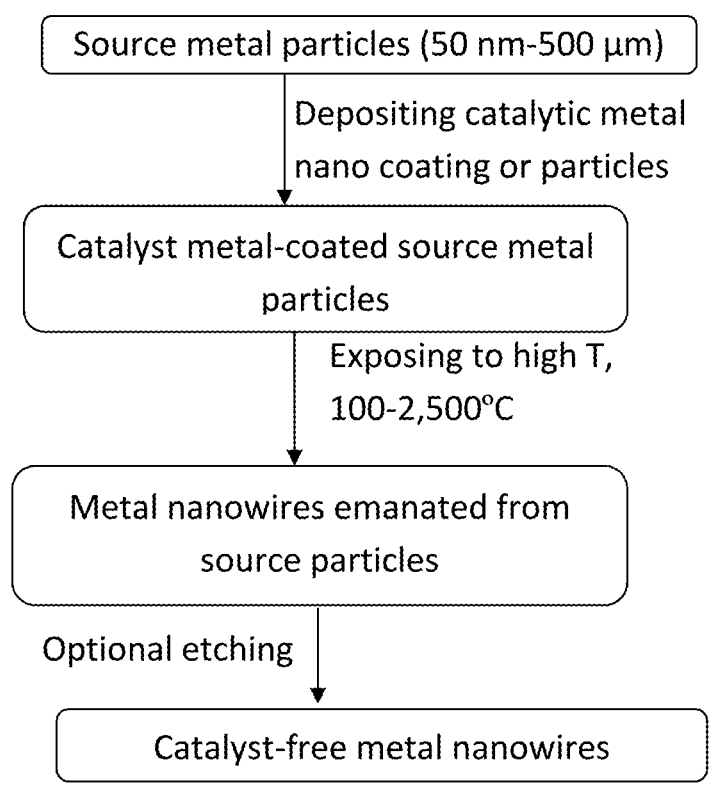
FIG. 1 A flow chart showing a preferred route to preparing metal nanowires from particles of the same metal material, having a diameter from 50 nm to 500 μm.

As illustrated in FIG. 1, in certain embodiments, the invented process begins by preparing a catalyst metal-coated source metal particle. This is accomplished by carrying out the following procedures: (A) preparing a source metal in a particulate form (e.g. multiple particles of a source metal) having a size from 50 nm to 500 μm, wherein the source metal material contains neat metal element (having at least 99.9% by weight of Cu, for instance) or a Cu alloy or mixture (having from 70% to 99.9% by weight of Cu therein); and (B) depositing a catalytic metal, in the form of nanoparticles having a diameter from 1 nm to 100 nm or a coating having a thickness from 1 nm to 100 nm, onto surfaces of the source metal material to form a catalyst metal-coated source metal material. This is then followed by step (C) of exposing the catalyst metal-coated material to a high temperature environment, from 100° C. to 2,500° C., for a period of time sufficient to enable a catalytic metal-catalyzed growth of multiple metal nanowires from the source metal material particle. These metal nanowires are emanated or extruded out from the source metal particles, which act as the source material for the growing metal nanowires to feed on.

The starting source metal material particles preferably have a diameter from 100 nm to 10 μm, more preferably <3 μm. The starting source metal particles are preferably spherical, cylindrical, or platelet (disc, ribbon, etc.) in shape, but can be of any shape. Source metal particles of various shapes and various particle sizes are commercially available.

Figure 2:
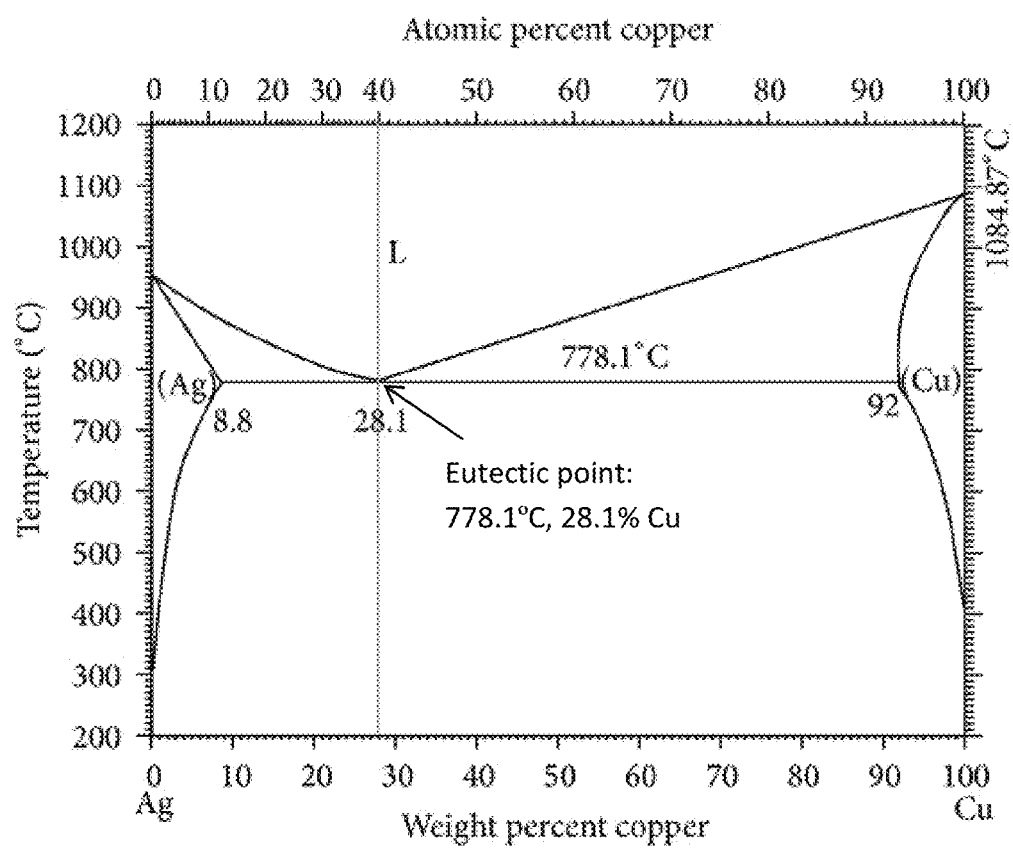
FIG. 2 Phase diagram of the Ag—Cu system, having a eutectic point: 778.1° C. and 28.1% Cu.
Figure 3:
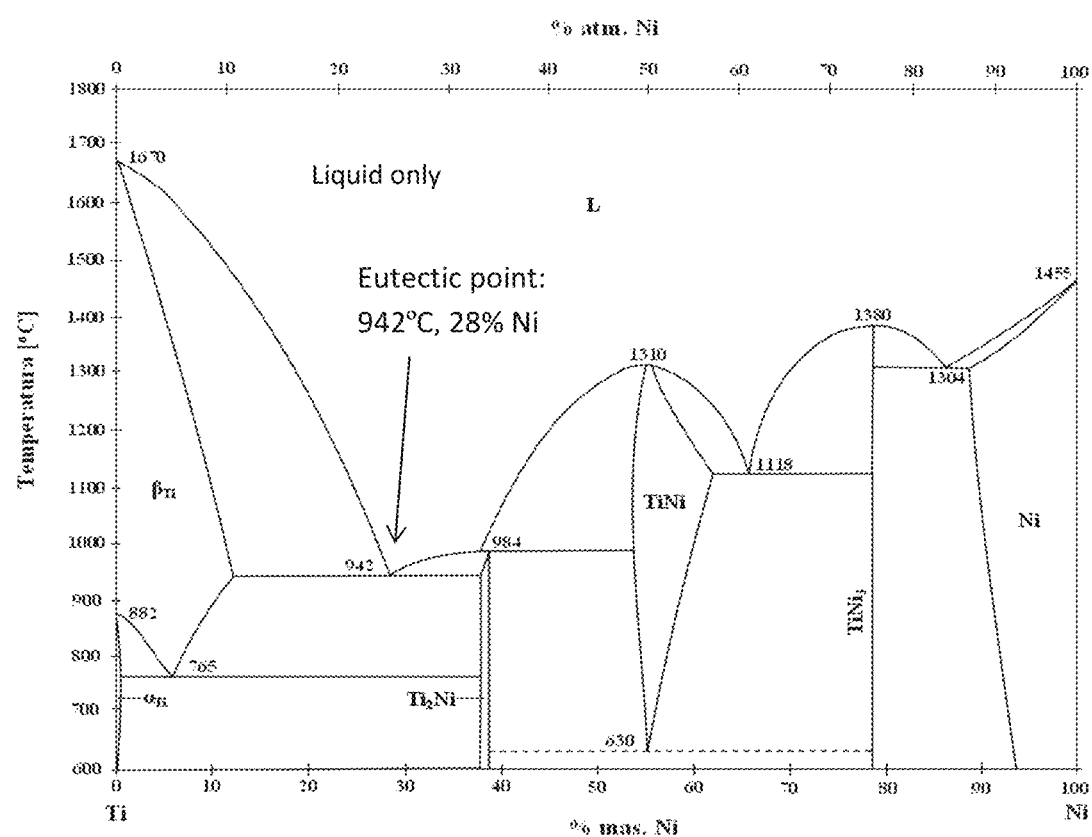
FIG. 3 Phase diagram of the Ti—Ni system, having a Eutectic point: 942° C., 28% Ni.

It may be noted that this high temperature range depends on the catalytic metal used. Two examples are used herein to illustrate the best mode of practice. Shown in FIG. 2 and FIG. 3 are phase diagrams of the Ag—Cu and Ti—Ni system, respectively. In the first example, Cu is the source metal material and Ag is the catalyst metal for the purpose of growing Cu nanowires. For the purpose of growing Ag nanowires, Ag is the source metal and Cu is the catalyst metal. In the second example, Ti is the source metal material and Ni is the catalyst metal for the purpose of growing Ti nanowires. For the purpose of growing Ni nanowires, Ni is the source metal and Ti is the catalyst metal.

In the Ag–Cu binary system, there exists a eutectic point at a eutectic temperature Te=778.1° C. and eutectic composition Ce=28.1% Cu (atomic percentage of Cu). A mass of Ag-coated Cu particles may be slowly heated to above Te (e.g. a high temperature from 778° C. to 930° C., which are lower than both the melting temperature of the source metal, 1,084.9° C., and the melting temperature of the catalyst metal, 950° C.). The heating rate can be from 1 to 100 degrees/min (centigrade scale). One can allow the Ag-coated Cu particles to stay at this high temperature (say 850° C.) for 1 minute to 3 hours and then cool the material down to 790° C. (slightly above Te) and/or even 770° C. (slightly below Te) for 1-180 minutes. This will lead to the formation of Cu nanowires from the Ag-coated Cu particles. Alternatively, one may choose to cool the material slowly down from 850° C. (after staying at this temperature for a desired period of time) to room temperature.

In the Ti—Ni binary system, there exists a eutectic point at a eutectic temperature Te=942° C. and eutectic composition Ce=28% Ni (atomic percentage of Ni). A mass of Ni-coated Ti particles may be slowly heated to above Te (e.g. a high temperature from 950° C. to 1,450° C., which are lower than both the melting temperature of the source metal, 1,670° C., and the melting temperature of the catalyst metal, 1,455° C.). The heating rate can be from 1 to 100 degrees/min (centigrade scale). One can allow the Ni-coated Ti particles to stay at this high temperature (say 1,100° C.) for 1 minute to 3 hours and then cool the material down to 950° C. (slightly above Te) and/or even 935° C. (slightly below Te) for 1180 minutes. This will lead to the formation of Ti nanowires from the Ni-coated Ti particles. Alternatively, one may choose to cool the materials slowly down from 1,100° C. (after staying at this temperature for a desired period of time) to room temperature.

In some embodiments, the step of depositing a catalytic metal includes: (a) dissolving or dispersing a catalytic metal precursor in a liquid to form a precursor solution; e.g. dissolving nickel nitrate, $Ni(NO_3)_2$, in water; (b) bringing the precursor solution in contact with surfaces of source metal particles; e.g. immersing the particles into the $Ni(NO_3)_2$-water solution; (c) removing the liquid component; e.g. vaporizing water of the $Ni(NO_3)_2$-water solution, allowing $Ni(NO_3)_2$ to coat onto the surfaces of the source metal particles; and (d) chemically or thermally converting the catalytic metal precursor (e.g. $Ni(NO_3)_2$) to the catalytic metal coating or metal nanoparticles; e.g. by heating the $Ni(NO_3)_2$-coated mass at 450-650° C. in a reducing environment (e.g. in a flowing gas mixture of hydrogen and argon).

In one embodiment, the step (d) of chemically or thermally converting the catalytic metal precursor is conducted concurrently with the step of exposing the catalyst metal-coated source metal particles to a high temperature environment.

In certain embodiments, the catalytic metal precursor is a salt or organo-metal molecule of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof. In some preferred embodiments, the catalytic metal precursor is selected from a nitrate, acetate, sulfate, phosphate, hydroxide, or carboxylate of a metal selected from Cu, Ni, Co, Mn, Fe, Ti, Al, Ag, Au, Pt, Pd, Pb, Bi, Sb, Zn, Cd, Ga, In, Zr, Te, P, Sn, Ge, Si, As, Te, Se, or a combination thereof.

In some embodiments, the catalytic metal precursor is selected from a nitrate, acetate, sulfate, phosphate, hydroxide, or carboxylate of a transition metal. In certain embodiments, for instance, the catalytic metal precursor is selected from copper nitrate, nickel nitrate, cobalt nitrate, manganese nitrate, iron nitrate, titanium nitrate, aluminum nitrate, copper acetate, nickel acetate, cobalt acetate, manganese acetate, iron acetate, titanium acetate, aluminum acetate, copper sulfate, nickel sulfate, cobalt sulfate, manganese sulfate, iron sulfate, titanium sulfate, aluminum sulfate, copper phosphate, nickel phosphate, cobalt phosphate, manganese phosphate, iron phosphate, titanium phosphate, aluminum phosphate, copper carboxylate, nickel carboxylate, cobalt carboxylate, manganese carboxylate, iron carboxylate, titanium carboxylate, aluminum carboxylate, or a combination thereof. Different types of precursor require different temperatures and/or chemical reactants for conversion to the catalytic metal phase. Different catalytic metals enable metal nanowire growth at different temperatures.

The step of depositing a catalytic metal may also be conducted by a procedure of physical vapor deposition (PVD), chemical vapor deposition (CVD), sputtering, plasma deposition, laser ablation, plasma spraying, ultrasonic spraying, printing, electrochemical deposition, electrode plating, electrodeless plating, chemical plating, ball milling, or a combination thereof.

The procedure of exposing the catalyst metal-coated source metal particle powder mass to a high temperature environment is preferably conducted in a protective or reducing atmosphere of an inert gas, nitrogen gas, hydrogen gas, a mixture thereof, or in a vacuum.

In one embodiment, the process may further comprise a procedure of removing the residual catalytic metal from the metal nanowires; for instance, via chemical etching or electrochemical etching.

For lithium-ion battery anode applications, the process of producing metal nanowires is followed by a procedure of incorporating a carbonaceous or graphitic material into the mass of multiple metal nanowires as a conductive additive in the preparation of an anode electrode. This carbonaceous or graphitic material may be selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

For instance, multiple Cd or Zn nanowires may be readily packed into a porous membrane or mat (with or without a small amount of resin binder), which may be impregnated or infiltrated with carbon under a chemical vapor deposition (CVD) or chemical vapor infiltration condition. This may be accomplished by introducing methane or ethylene gas into the system at a temperature of 500° C.-1,500° C. Alternatively, one may impregnate the porous Cd or Zn nanowire membrane with a resin or pitch, which is then heated to carbonize the resin or pitch at a temperature of 350° C.-1, 500° C. Alternatively, one may simply blend metal nanowires with particles of a carbon or graphite material with an optional binder resin to form a multi-component mixture.

The following examples are provided for the purpose of illustrating the best mode of practicing the present invention and should not be construed as limiting the scope of the instant invention.

EXAMPLE 1

Tin-Assisted Growth of Zn Nanowires from Zn Particles

Zinc particles were coated with a thin layer of Sn using a simple physical vapor deposition up to a thickness of 1.3-3.7 nm. The Sn—Zn system is known to have a eutectic point at Te=198.5° C. and Ce=14.9% Zn. A powder mass of Sn-coated Zn particles (2.2 μm in diameter) were heated to 220° C. and allowed to stay at 220° C. for 1 hour and then cooled down to 200° C. and maintained at 200° C. for 30 minutes. The material system was then naturally cooled to room temperature after switching off the power to the oven. The Zn nanowires grown from Zn particles were found to have diameters in the approximate range of 27-66 nm.

EXAMPLE 2

Ag-Assisted Growth of Cu Nanowires from Cu Particles

An amount of Cu powder was exposed to Ag sputtering to obtain Ag-coated Cu particles. A mass of Ag-coated Cu particles was slowly heated to above Te (reaching 880° C.>Te). The heating rate was 20 degrees/min (centigrade scale). The Ag-coated Cu particles were allowed to stay at this high temperature (880° C.) for 1 hour and then cooled down to 790° C. (slightly above Te) and stayed at 790° C. for 1 hour, followed by naturally cooling down to room temperature. This led to the formation of Cu nanowires from the Ag-coated Cu particles. The diameter of Cu nanowires produced is in the range from 23 nm to 46 nm.

EXAMPLE 3

Cu-Assisted Growth of Ag Nanowires from Ag Particles

The Ag particles were immersed in a solution of copper acetate in water. Water was subsequently removed and the dried Ag particles were coated with a thin layer of copper acetate. These metal precursor-coated Ag particles were then exposed to a heat treatment in a reducing atmosphere of $H_2$ and Ar gas according to a desired temperature profile. This profile typically included from room temperature to a reduction temperature of approximately 300-600° C. (for reduction of copper acetate to Cu nanocoating). A mass of Cu-coated Ag particles was further heated to above Te (e.g. a high temperature from 870° C.). The heating rate was 10 degrees/min (centigrade scale). The Cu-coated Ag particles were allowed to stay at this high temperature (870° C.) for 2 hours and then cooled down to 780° C. (slightly above Te) and stayed at 780° C. for 1 hour, followed by naturally cooling down to room temperature. This led to the formation of Ag nanowires from the Cu-coated Ag particles. The diameter of Ag nanowires produced is in the range from 23 nm to 46 nm.

EXAMPLE 4

Magnesium-Assisted Growth of Al Nanowires from Al Particles

Al particles were cleaned in a dilute HCl-water solution and then dried in a vacuum oven for 5 hours prior to being mixed with Mg particles in a ball mill chamber. The mixture was milled for 30 minutes to allow for deposition of Mg on Al particle surfaces in a protective atmosphere ($H_2$/Ar-10/90 ratio gas mixture). Mr-coated Al particles were heated to 530° C. and maintained at this temperature for 2 hours in a protective atmosphere ($H_2$/$N_2$-10/90 ratio gas mixture) and then cooled down to approximately 450° C., stayed at this temperature for 1 hour and then cooled down to room temperature.

EXAMPLE 5

Zinc-Assisted Growth of Mg Nanowires from Mg Particles

Mg particles were deposited with a thin film of Zn using an electroplating method. Zn-coated Mg particles were heated to 500° C. and maintained at this temperature for 2 hours in a protective atmosphere ($H_2$/$N_2$-10/90 ratio gas mixture). The material was then cooled down to approximately 360° C., stayed at this temperature for 1 hour and then cooled down to room temperature. Mg nanowires are particularly useful for use as an anode active material in a Mg-ion battery that exhibits high-rate capability.

EXAMPLE 6

Nickel-Assisted Growth of Ti Nanowires from Ti Particles

Ti particles were immersed in a solution of nickel nitrate or nickel acetate in water. Water was subsequently removed and the dried particles were coated with a thin layer of nickel nitrate or nickel acetate. These metal precursor-coated Ti particles were then exposed to a heat treatment in a reducing atmosphere of $H_2$ and Ar gas according to a desired temperature profile. This profile typically included from room temperature to a reduction temperature of approximately 300-700° C. (for reduction of nickel nitrate or acetate to Ni nanocoating, for instance). The temperature was continued to rise to a final temperature of 1,200° C. and stay for 3 hours and the system was allowed to cool down naturally. Nickel metal catalyst-assisted growth of Ti nanowires from Ti particles was found to occur. The diameter of Ti nanowires produced was in the range from 42 nm to 65 nm.

I claim:
1. A process for producing metal nanowires having a diameter or thickness from 2 nm to 100 nm, said process comprising:
   (A) preparing a source metal material in a solid particulate form having a size from 50 nm to 500 μm, wherein said source metal material is selected from a transition metal, Al, Be, Mg, Ca, an alloy thereof, a compound thereof, or a combination thereof;
   (B) depositing a catalytic metal, in the form of nanoparticles having a size from 1 nm to 100 nm or a coating having a thickness from 1 nm to 100 nm, onto a surface of said source metal particulate to form a catalyst metal-coated metal material, wherein said catalytic metal is different than said source metal material, wherein said catalytic metal is selected from Co, Mn, Fe, Ti, Pb, Bi, Sb, Zn, Cd, Ga, In, Zr, Te, P, Sn, Ge, Si, As, Te, Se, or a combination thereof; and (C) exposing said catalyst metal-coated metal material to a high temperature environment, from 100° C. to 2,500° C., for a period of time sufficient to enable a catalytic metal-assisted growth of multiple metal nanowires from said source metal particulate.

2. The process of claim 1, wherein said solid metal material particulate has a diameter from 100 nm to 10 μm.

3. The process of claim 1, wherein said transition metal is selected from Cu, Ni, Co, Mn, Fe, Ti, Ag, Au, Pt, Pd, Zn, Cd, Mo, Nb, Zr, an alloy thereof, or a combination thereof.

4. The process of claim 1, wherein said step of depositing a catalytic metal includes (a) dissolving or dispersing a catalytic metal precursor in a liquid to form a precursor solution, (b) bringing said precursor solution in contact with a surface of said source metal particulate material, (c) removing said liquid; and (d) chemically or thermally converting said catalytic metal precursor to said catalytic metal coating or nanoparticles.

5. The process of claim 4, wherein said step (d) of chemically or thermally converting said catalytic metal precursor is conducted concurrently with the procedure (C) of exposing said catalyst metal-coated mixture mass to a high temperature environment.

6. The process of claim 1, wherein said step of depositing a catalytic metal is conducted by a procedure of physical vapor deposition, chemical vapor deposition, sputtering, plasma deposition, laser ablation, plasma spraying, ultrasonic spraying, printing, electrochemical deposition, electrode plating, electrodeless plating, chemical plating, ball milling, or a combination thereof.

7. The process of claim 1, wherein said procedure of exposing said catalyst metal-coated metal material to a high temperature environment is conducted in a protective atmosphere of an inert gas, nitrogen gas, hydrogen gas, a mixture thereof, or in a vacuum.

8. The process of claim 1, wherein said source metal material and said catalytic metal form an eutectic point and said procedure of exposing said catalyst metal-coated metal material to a high temperature environment includes exposing said catalyst metal-coated material to an initial temperature Ti equal to or higher than said eutectic point for a desired period of time and then bringing said catalyst metal-coated material to a temperature Tc, wherein Tc is above or below said eutectic point.

9. The process of claim 8, wherein said initial exposure temperature Ti is higher than said eutectic temperature by 0.5 to 500 degrees on the Celsius scale.

10. The process of claim 1, further comprising a procedure of removing said catalytic metal from said metal nanowires.

11. The process of claim 1, further comprising a procedure of mixing metal nanowires with a carbonaceous or graphitic material as a conductive additive and an optional binder material to form an electrode layer, wherein said carbonaceous or graphitic material is selected from a chemical vapor deposition carbon, physical vapor deposition carbon, amorphous carbon, chemical vapor infiltration carbon, polymeric carbon or carbonized resin, pitch-derived carbon, natural graphite, artificial graphite, mesophase carbon, mesophase pitch, mesocarbon microbead, soft carbon, hard carbon, coke, carbon fiber, carbon nanofiber, carbon nanotube, carbon black, or a combination thereof.

12. A process for producing metal nanowires having a diameter or thickness from 2 nm to 100 nm, said process comprising:

a) preparing a source metal material in a particulate solid form having a size from 50 nm to 100 μm, wherein said source metal material is selected from a transition metal, Al, Be, Mg, Ca, an alloy thereof, a compound thereof, or a combination thereof;

b) depositing a catalyst metal precursor onto a surface of said source metal particulate to form a catalyst metal precursor-coated metal material; and c) exposing said catalyst metal precursor-coated metal material to a high temperature environment, from 100° C. to 2,500° C., for a period of time sufficient to convert said catalyst metal precursor to a catalyst metal in the form of nanoparticles having a size from 1 nm to 100 nm or a coating having a thickness from 1 nm to 100 nm in physical contact with a surface of said source metal particulate, and enable a catalyst metal-assisted growth of multiple metal nanowires from said source metal particulate, wherein said catalyst metal is selected from Co, Mn, Fe, Ti, Pb, Bi, Sb, Zn, Cd, Ga, In, Zr, Te, P, Sn, Ge, Si, As, Te, Se, or a combination thereof.

13. The process of claim 12, wherein said source metal material and said catalyst metal form an eutectic point and said step (c) of exposing said catalyst metal precursor-coated metal material to said high temperature environment includes exposing said catalyst metal precursor-coated metal material to an exposure temperature equal to or higher than said eutectic point for a desired period of time and then bringing said catalyst metal precursor-coated metal material to a temperature below said exposure temperature for a desired period of time or at a desired temperature decreasing rate.

* * * * *